United States Patent [19]

Derr

[11] Patent Number: 5,793,910
[45] Date of Patent: Aug. 11, 1998

[54] METHOD AND CIRCUIT ARRANGEMENT FOR FREQUENCY STABILIZATION OF A WDM MULTIPLEXER/DEMULTIPLEXER

[75] Inventor: Frowin Derr, Ulm, Germany

[73] Assignee: Siemens Aktiengesellschaft, Munich, Germany

[21] Appl. No.: 788,189

[22] Filed: Jan. 24, 1997

[30] Foreign Application Priority Data

Jan. 25, 1996 [DE] Germany ............ 196 02 677.6

[51] Int. Cl.$^6$ .................................................. G02B 6/28
[52] U.S. Cl. ........................................... 385/24; 359/569
[58] Field of Search ................................... 385/3, 40, 24, 385/46, 133, 45; 359/569, 209, 573, 124, 315, 571, 140, 161, 186

[56] References Cited

U.S. PATENT DOCUMENTS

| | | | |
|---|---|---|---|
| 5,151,814 | 9/1992 | Grinberg et al. | 359/209 |
| 5,226,100 | 7/1993 | Maerz | 385/45 |
| 5,351,317 | 9/1994 | Weber | 385/3 |
| 5,559,906 | 9/1996 | Maerz | 385/40 |

FOREIGN PATENT DOCUMENTS 43 27 103  2/1994  Germany.

OTHER PUBLICATIONS

Wavelength–Adaptable Optical Phased Array in SiO$_2$–Si–P.C. Clemens et al 1995 IEEE Photonics Technology Letters, vol. 7, No. 10 Oct.

*Primary Examiner*—Akm E. Ullah
*Attorney, Agent, or Firm*—Hill & Simpson

[57] ABSTRACT

For frequency stabilization of a WDM multiplexer/demultiplexer with an optical phased array, a control signal with reference to which the WDM multiplexer/demultiplexer temperature is set is acquired by subtraction of the two opto-electrically converted output reference signals of two reference signal channels of the single-channel side of the optical phased array having filter curves intersect at a frequency corresponding to the frequency of an input reference signal supplied at the multiplex side.

5 Claims, 4 Drawing Sheets

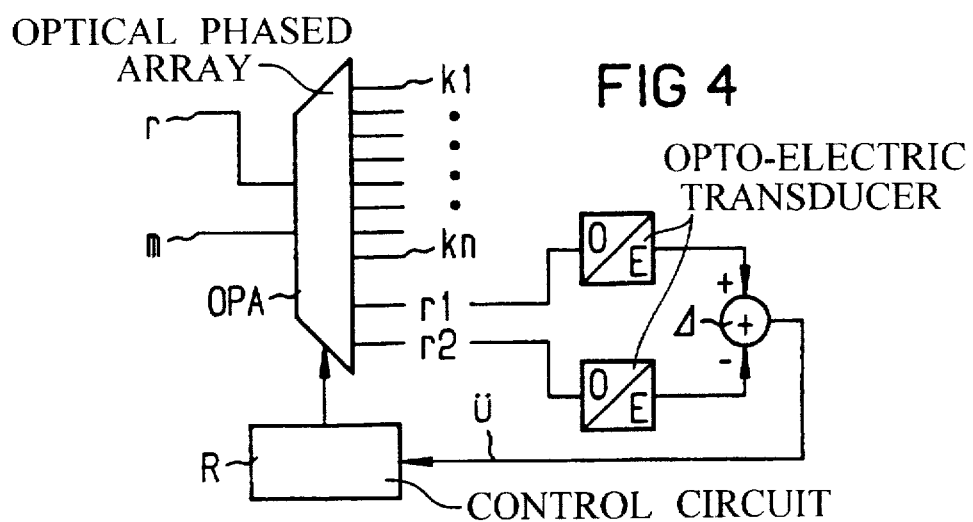
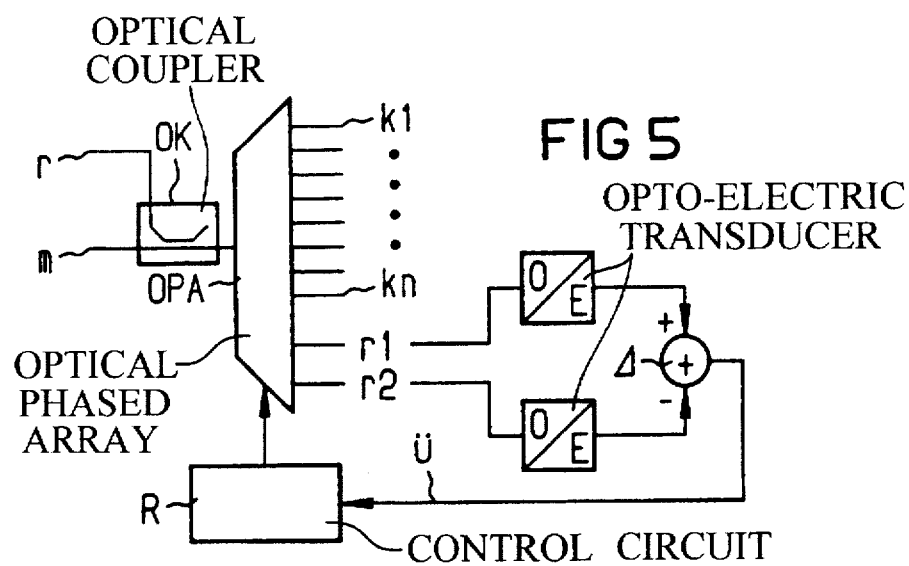
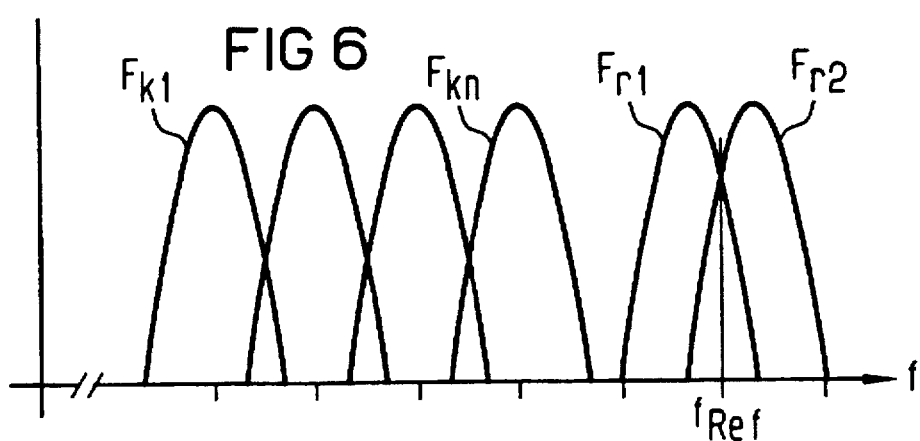

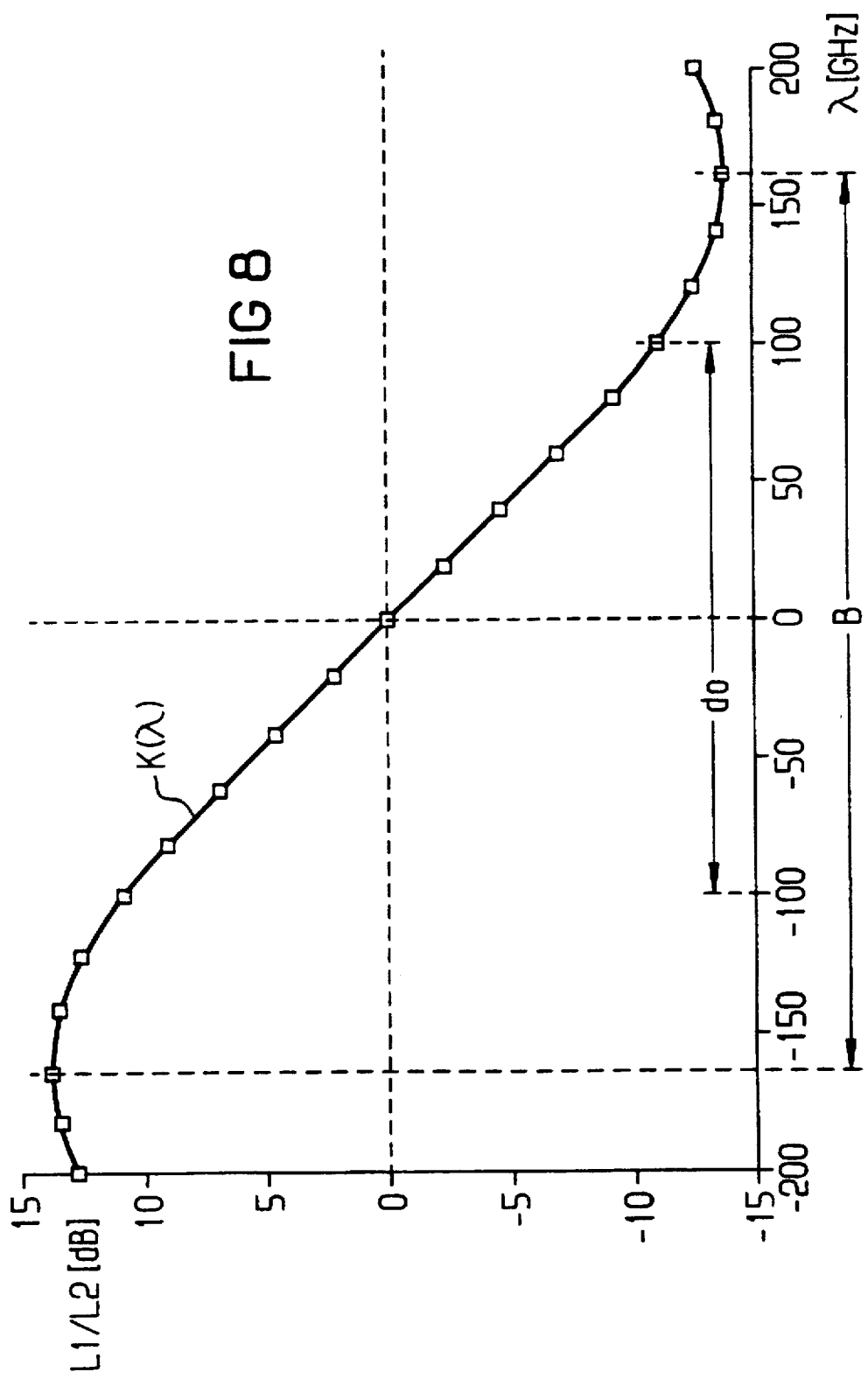

METHOD AND CIRCUIT ARRANGEMENT FOR FREQUENCY STABILIZATION OF A WDM MULTIPLEXER/DEMULTIPLEXER

BACKGROUND OF THE INVENTION

Essential components of (dense) WDM (wavelength division multiplex) telecommunication systems or, in other words, of optical frequency division multiplex (OFDM) systems are WDM multiplexers/demultiplexers for combining optical channels in the (dense) wavelength division multiplex, or for separating optical channels combined in the (dense) wavelength division multiplex from one another (telcom report international 18 (1994) Special "ISS'95", 10 ... 14). Such optical frequency division multiplexers/ demultiplexers can, for example, be manufactured in $SiO_2$/ Si technology in the form of what are referred to as optical phased arrays; as also indicated in FIG. 1, such an optical phased array OPA realizing a WDM multiplexer/ demultiplexer can fundamentally comprise two flat waveguides M, D on a substrate between whose inside end faces a plurality of strip waveguides w1, ... . ww—forming what is referred to as a phase shifter—proceed with a length changing from waveguide w1, ... to waveguide ... . ww, and at whose end faces facing away from one another the channel-individual light waveguides k1, ... . , kn or the multiplex waveguides m abut (IEEE Photon. Technol. Lett., 7(1992)10, pp.1040–1041).

Given such WDM multiplexers/demultiplexers realized with an optical phased array, the filter characteristic must be stabilized to an absolute optical reference frequency.

A detuning, i.e. a shift of the entire frequency transmission band of the WDM multiplexer/demultiplexer can be fundamentally achieved by a variation of the temperature of the optical phased array.

A temperature control of the WDM multiplexer/ demultiplexer therefore involves a certain stabilization of the WDM multiplexer/demultiplexer; this, however, does not represent an active regulation of the WDM multiplexer/ demultiplexer with respect to the optical frequency.

The employment of a frequency-modulated, absolutely stable optical source is more expedient, for example an optical source based on an atomic transition of krypton (IEEE Photon. Technol. Lett., 6(1994)11, pp.1383–1385) whose frequency corresponds to the optical frequency of one of the optical channels combined by or separated from one another by the WDM multiplexer/demultiplexer. The frequency modulation part at the filter edges is thereby converted into an amplitude modulation that can be evaluated with a lock-in amplifier and is used for a corresponding readjustment of the WDM multiplexer/demultiplexer temperature (see, for comparison, IEEE Photon. Technol. Lett., 6(1994)11, pp. 1383–1385).

What is thereby disadvantageous is that one of the optical channels must thereby be occupied as a reference channel and is thus not available as a useful channel. Further, given a large channel separation (for example, 400 Ghz)—and, thus, a large passband width—, a large frequency modulation amplitude is required so that an adequately large FM/AM component is available for evaluation. However, a pure frequency modulation with high frequency swing only be achieved with high realization expense given currently available laser sources.

SUMMARY OF THE INVENTION

It is an object of the invention to disclose a way to obtain a cost-beneficial realization of the stabilization of the optical frequency multiplexer/demultiplexers to a given optical reference frequency required in WDM systems.

The invention is directed to a method for frequency stabilization of a WDM multiplexer/demultiplexer with an optical phased array. This method is inventively characterized in that a control signal with reference to which the WDM multiplexer/demultiplexer temperature is set is acquired by subtraction of the two opto-electrically converted output reference signals of two reference signal channels of the single-channel side of the optical phased array whose filter curves intersect at a frequency corresponding to the frequency of an input reference signal supplied at the multiplex side.

In a circuit arrangement of the invention for frequency stabilization of a WDM multiplexer/demultiplexer with an optical phased array, the phased array comprises two reference waveguide outputs at the single-channel side for which the transmission behavior of the phased array is selected such that the two filter curves belonging to the two outputs intersect right at a frequency corresponding to the frequency of a reference signal supplied at the multiplex side. The two reference waveguide outputs respectively lead via an opto-electrical transducer to the two inputs of a substraction circuit that in turn leads to the monitoring input of a control circuit for temperature-control of the optical phased array.

The invention advantageously enables a cost-beneficial stabilization of optical frequency multiplexer/ demultiplexers to a given optical reference frequency; the optical reference frequency can thus also lie in the optical frequency range of the payload signals without influencing their passage through the optical frequency multiplexer/ demultiplexer.

BRIEF DESCRIPTION OF THE DRAWINGS

FIG. 4 shows the block circuit diagram of such a WDM multiplexer/demultiplexer;

FIG. 5 shows the block circuit diagram of a modified exemplary embodiment of such a WDM multiplexer/ demultiplexer;

FIG. 6 illustrates the transmission behavior of an optical phased array with four channels and two reference outputs;

FIG. 8 outlines a beneficial characteristic of the optical phased array.

DESCRIPTION OF THE PREFERRED EMBODIMENTS

Figure 1:
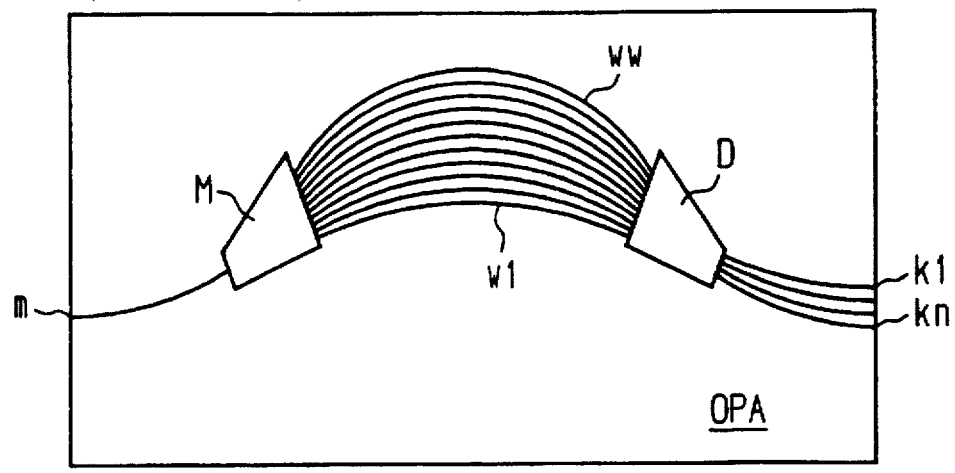
FIG. 1 is a schematic circuit diagram of a known optical phased array realizing a WDM multiplexer/demultiplexer.

FIG. 1 outlines an optical phased array realizing a WDM multiplexer/demultiplexer that fundamentally comprises two flat waveguides M, D on a substrate between whose inside end faces a plurality of strip waveguides w1, ... , ww—forming what is referred to as a phase shifter— proceed with a length changing from waveguide w1, ... to waveguide ... , ww, and at whose end faces facing away from one another the channel-individual light waveguides k1, ... , kn or the multiplex waveguide m abut.

Figure 2:
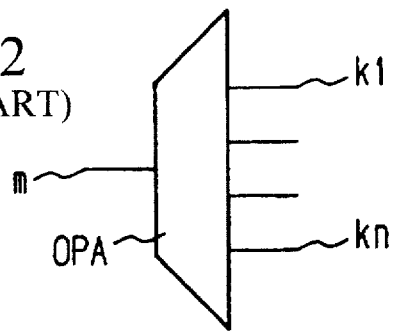
FIG. 2 is a block circuit diagram of such a WDM multiplexer/demultiplexer.

FIG. 2 shows the block circuit diagram of such a WDM multiplexer/demultiplexer in which the corresponding circuit elements are provided with the same reference characters as in FIG. 1, so that no flrther explanation is needed in this respect.

Figure 3:
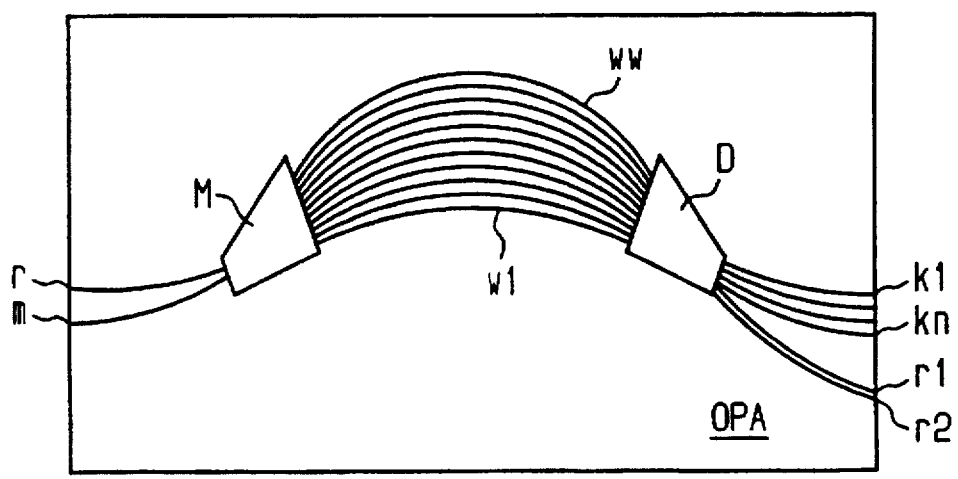
FIG. 3 shows the schematic circuit diagram of an optical phased array realizing a WDM multiplexer/demultiplexer according to the invention.

The structure of an optical phased array multiplexer/demultiplexer outlined in FIG. 1 is then expanded according to FIG. 3 in order to enable a simple stabilization of the WDM multiplexer/demultiplexer to an arbitrary frequency, whereby this frequency, in particular, can also lie in the frequency range of the payload signals without influencing their passage through the WDM multiplexer/demultiplexer.

According to FIG. 3, the optical phased array OPA comprises—in addition to the elements already cited in the explanation of FIG. 1 and provided with the same reference characters in FIG. 3—two reference waveguide outputs r1, r2 at the single-channel side for which the transmission behavior of the phased array OPA is selected such that the two filter curves belonging to the two outputs r1, r2 intersect right at a frequency corresponding to the frequency $f_{Ref}$ of an optical reference signal supplied at the multiplex side.

Let us look at FIG. 6 with respect thereto, this illustrating the fundamental transmission behavior of an optical phased array (OPA in FIG. 3) with four useful channels k1, . . . , kn in FIG. 3) and two reference outputs (r1, r2 in FIG. 3) for a reference frequency $f_{Ref}$ lying outside the employed optical frequency range with corresponding filter curves $F_{k1}$, . . . $F_{kn}$, $F_{r1}$, $F_{r2}$.

Returning to FIG. 3, the optical reference signal can be supplied to the multiplex side of the optical phased array OPA via an additional fiber input r that is coupled to the inner phased array structure such that the reference signal is coupled out exactly in the intersection of the two filter curves $F_{r1}$, $F_{r2}$ (in FIG. 6).

FIG. 4 shows the block circuit diagram of such a WDM multiplexer/demultiplexer, whereby the corresponding circuit elements are provided with the same reference characters as in FIG. 3, so that no further explanation is needed in this respect. According to FIG. 4, the two reference outputs r1, r2 then respectively lead via an opto-electric transducer O/E to the two inputs of a subtraction circuit Δ that in turn leads to the monitoring input u of a control circuit R for controlling the temperature of the optical phased array OPA. The temperature of the optical phased array OPA is then regulated to a rated temperature value for tuning its frequency behavior with a control signal that is generated according to the criterion of the difference between the optoelectrically converted reference output signals. The transmission behavior of the two reference signal outputs r1, r2 is thereby selected such that the frequency at which the two filter curves ($F_{r1}$, $F_{r2}$ in FIG. 6) corresponds to the reference frequency. The control circuit then sets the temperature of the optical phased array such that the intersection of the edges of the two filter curves $F_{r1}$, $F_{r2}$ in fact lies right at the reference frequency $f_{Ref}$. In this case, identical optical levels derive at the two reference outputs r1, r2, and, thus, identical electrical signals derive at the two inputs of the subtraction circuit Δ, so that the control signal becomes zero when the two signals are subtracted from one another.

When, as is the case in the exemplary embodiment of FIGS. 3 and 4, the optical reference signal is supplied to the multiplex side of the optical phased array via an additional fiber input r that is attached to the inner phased array structure such that the reference signal is coupled out exactly in the filter intersection of the two reference outputs r1, r2, then one basically has a free hand in the selection of the reference frequency $f_{Ref}$.

Alternatively, however, it is also possible to provide a common terminal for the optical multiplex signal and the optical reference signal. The reference frequency $f_{Ref}$ must then lie outside the optical frequency range occupied by the useful channels, as can also be seen from FIG. 6. Insofar as the optical reference signal is not already contained in the multiplex signal, it can thereby be coupled into the multiplex fibers m via an optical coupler OK, as indicated in FIG. 5. Otherwise, the exemplary embodiment outlined in FIG. 5 agrees with the exemplary embodiment of FIG. 4, so that descriptions thereof also correspondingly apply to the exemplary embodiment according to FIG. 5 and need not be repeated in detail here.

For frequency stabilization of the WDM multiplexer/demultiplexer realized with the optical phased array OPA (in FIGS. 3 through 5) in any case, in summary a control signal with reference whereto the temperature of the WDM multiplexer/demultiplexer is set is acquired by subtraction of the two opto-electrically converted output reference signals of two reference signal channels of the single-channel side of the optical phased array OPA whose filter curves $F_{r1}$, $F_{r2}$ (in FIG. 6) intersect at a frequency ($f_{Ref}$) corresponding to the frequency of an input reference signal supplied at the multiplex side.

In the optical phased array OPA of FIG. 3, the reference waveguide outputs r1, r2 or the waveguide end sections leading to the actual reference outputs of the optical phased array, to be more precise, meet the flat waveguide D at an extremely slight distance from one another, so that, in a certain sense, they form an optical coupler arrangement in this region at which crosstalk can occur between the two waveguide end sections. Such crosstalk, however, is to be avoided to the farthest possible extent, at least over the fther course of the waveguide end sections. For this purpose, the waveguide end sections are arranged at a distance from one another that increases from the slight distance $d_s$ at the flat waveguide, as schematically illustrated in an exemplary embodiment in FIG. 7.

Figure 7:
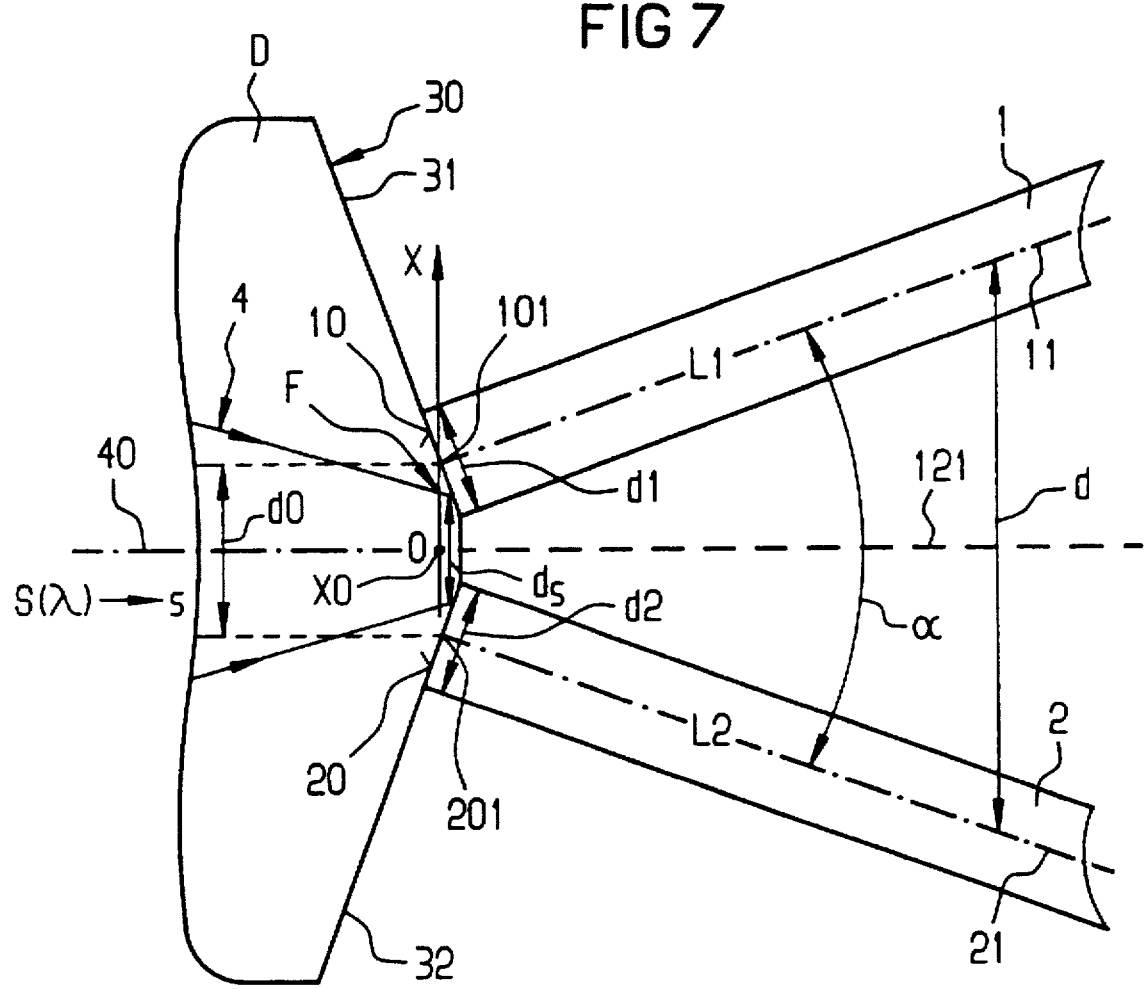
FIG. 7 schematically shows a plan view onto a special characteristic of an expedient realization of the optical phased array.

According to FIG. 7, such an optical coupler arrangement is composed of a pair of strip-like optical waveguide end sections 1 and 2 proceeding next to one another having the ends 10 or 20 arranged next to one another for coupling, for example, optical emission S supplied from a common direction s into the waveguide end sections 1 and 2.

The ends 10 and 20 are arranged at a distance d0 from one another measured, for example, between the centers 101 or 201 of the ends 10 and 20 that is dimensioned so small that crosstalk would occur in the optical waveguide end sections 1 and 2 proceeding next to one another at this slight distance d0. In the example of FIG. 7, the slight distance d0 is selected such that there is a gap between the ends 10 and 20; it could also be selected such that the ends 10 and 20 touch gap-free.

The waveguide end sections 1 and 2 are then arranged at a distance d from one another that increases proceeding from the slight distance d0 at the ends 10 and 20. Given the assumed direction s of the emission S to be coupled in, this means, for example, that the distance d increases in this direction s proceeding from the ends 10 and 20.

The waveguide end sections 1 and 2 each respectively comprise, for example, an optical longitudinal axis 11 or 21 that are arranged obliquely relative to one another at the ends 10 or 20 of the waveguide end sections 1 and 2 at an angle α that widens in the assumed direction s.

It is established, for example, in the exemplary embodiment of FIG. 7 such that the angle α comprises a median line 121 aligned in the direction s and the increasing distance d is the distance between the two longitudinal axes 11 and 12 of the waveguide end sections 1 and 2 measured perpendicular to the median line 121. Moreover, it is also established such that the longitudinal axis 11 of the waveguide end section 1 passes through the center 101 of the end 10 of this end section 1, and the optical longitudinal axis 21 of the other waveguide end section 2 passes through the center 201 of the end 20 of this other end section 2.

The angle α, for example, is selected smaller than the aperture angle at the end 10 or 20 of a waveguide end section 1 and/or 2, and can amount to less than 2°. An angle of 1° already advantageously leads to an effective suppression of crosstalk. In a concrete realization of the exemplary embodiment, the angle α amounted to about 1.6°.

According to FIG. 7, the ends 10, 20 of the waveguide end sections 1 and 2 are coupled to an end face 30 of a film waveguide D in which the emission S to be coupled in is supplied to the ends 10 and 20. Let it be noted, that, given more than two waveguide end sections to be coupled to the end face, the configuration explained with reference to FIG. 7 can be employed at each pair of neighboring ends at which crosstalk occurs due to a slight distance between the ends of this pair.

The end face 30, for example, comprises two end face sections 31 and 32 residing obliquely relative to one another at the angle α to which the two waveguide end sections 1 and 2 are coupled. For example, the end 10 of the waveguide end section 1 is coupled to the end face section 31, and the end 20 of the other waveguide end section 2 is coupled to the other end face section 32. This could also be reversed.

Each waveguide end section preferably comprises a longitudinal axis residing essentially perpendicular to the end face section to which it is coupled. With reference to the example of FIG. 7, this means that the waveguide end section 1 coupled to the section 31 comprises the longitudinal axis 11 residing essentially perpendicular to this section 31, and the waveguide end section 2 comprises the longitudinal axis 21 residing essentially perpendicular to the section 32.

After reaching a value of the distance d large enough for suppressing crosstalk, the waveguide end sections 1 and 2 with the increasing distance $d_s$ from one another can merge into, for example, parallel strip-like waveguides (not shown) at a distance from one another that is at least equal to the large value. The merge can be produced, for example, by a curved path of the waveguide end sections 1 and 2. It is thereby expedient, although not necessary, when the waveguide end sections 1 and 2—proceeding from the ends 10 and 20—first proceed on a straight line over a certain path, i.e. comprise a longitudinal axis 11 or 21 proceeding on a straight line, and at most then merge into a path with a curved longitudinal axis 11 or 21.

The arrangement can be operated, for example, such that the emission S to be coupled in is supplied to the ends 10 and 20 of the waveguide end sections 1 or 2 in the form of a beam 4 comprising a defined diameter $d_s$ that is set to a specific position x0 with respect to the ends 10, 20. The defined diameter can be larger or smaller than a diameter of the end of a waveguide end section; preferably, the defined diameter of the beam is essentially equal to the diameter of the fundamental mode guided in a waveguide end section. The position of the beam 4 is determined, for example, by the position of an axis 40 of this beam 4 with reference to the ends 10 and 20.

The beam 4 is preferably a collimated or focussed beam. For example, the emission S to be coupled in is focussed with a focus F onto the ends 10 and 20 of the waveguide end sections 1 and 2 that is set to the specific position x0 with respect to the ends 10 and 20.

The beam 4 or focus F is preferably set to the specific position x0 by displacement in the direction of the slight distance d0, which is the direction of the x-axis in FIG. 7. For example, the specific position x0 is selected in FIG. 7 such that it lies in the middle between the centers 101 and 201 of the ends 10 and 20. This middle position is the preferred position in many cases. The specific position x0, however, can also deviate from the middle position on a case-by-case basis.

In FIG. 7, the beam 4 or focus F is shown such that the axis 40 of the beam 4, which is an axis of the focus F at the same time, is aligned, for example, in the assumed direction s, like the median line 121.

Let it be pointed out that the coupling arrangement is not limited to a specific direction s of the emission S to be coupled in. For example, a specific direction s of the emission S can be prescribed in such a way that it is composed of a rated or principal propagation direction s of the emission S from which certain deviations are allowed. In such a case, the axis 40 can deviate from the direction s by a certain angle (not shown), for example an angle lying within a prescribable or prescribed permissible range. A deviation from the direction s can be dependent on the topical position of the beam 4 or focus F with respect to the ends 10 and 20, for example the position x of its axis on the x-axis.

In cases wherein the position of the beam 4 or focus F with respect to the ends 10 and 20, for example the position x, is dependent on a wavelength λ of the emission S to be coupled in, for example x=f(λ) applies, where f is a specific or certain function, the beam 4 or focus F can be set to the specific position x0 by setting the wavelength λ to a value corresponding to the specific position x0.

Advantageously, a defined efficiency ratio can be set between a power part coupled into one waveguide end section and a power part coupled into the other waveguide end section from the emission S supplied to the ends 10 and 20 of the two waveguide end sections 1 and 2, for example the efficiency ratio L1/L2 or L2/L1 between a power part L1 coupled into the waveguide end section 1 and a power part L2 coupled into the other waveguide end section 2.

This possibility is based on the advantageous property of the coupling arrangement under consideration based on the suppression of crosstalk, according to which the efficiency ratio in the region of the slight distance d0 between the ends 10, 20 is an unambiguous monotonous function of the position x of the beam 4 or focus F with respect to the ends 10 and 20. There is thus the particular advantage that the efficiency ratio is a monotonous function of the position x of the beam 4 or focus F not only in the region of the slight distance d0 but in a larger region that contains this region. As a result of this fact, the arrangement is excellently suited for purposes of a regulation via the efficiency ratio as rated and actual value, whereby, moreover, a large pull-in range is available.

When the position x in the region of the distance or the larger region is an unambiguous monotonous function f of the specific wavelength λ of the emission S to be coupled in, the efficiency ration in this region is also an unambiguous monotonous function of this wavelength λ.

An example of such a case in shown in FIG. 8, wherein, for example, the efficiency ratio L1/L2 is entered dependent on the wavelength λ of the emission S.

In this example, the emission S was focussed onto these ends 10 and 20 with a diameter $d_s$ that was essentially equal to the diameter of the fundamental mode respectively guided in the waveguide end sections 1 and 2 that, for example, are dimensioned the same as one another. The diameter of the fundamental mode guided in each waveguide end section 1 and 2 is comparable to the diameter d1 or d2 of this section 1 or 2.

The position x of the beam 4 or focus F was essentially linearly dependent on the wavelength $\lambda$ in the larger region.

The slight distance measured between the centers 101 and 201 of the ends 10 and 20 amounted, for example, to 10 µm and was selected greater than the sum of the diameters of the two guided fundamental modes. The 10µm corresponds to 200 Ghz.

The zero point of the x-axis in FIG. 7 lays exactly in the middle between the two centers 101 and 201 of the ends 10 and 20. This zero point 0 corresponds to the zero point 0 of the $\lambda$-axis in FIG. 8. It can be clearly derived that the pull-in or captures range B, i.e. the range in which the efficiency ratio L1/L2 is a monotonous function $K(\lambda)$ of the wavelength $\lambda$, is somewhat larger than the range from −150 GHz through +150 GHz, this corresponding to a range of the position x from −15 µm through +15 µm.

Although various minor changes and modifications might be proposed by those skilled in the art, it will be understood that my wish is to include within the claims of the patent warranted hereon all such changes and modifications as reasonably come within my contribution to the art.

I claim as my invention:

1. A method for frequency stabilization of a wavelength division multiplex (WDM) multiplexer/demultiplexer with an optical phased array, comprising the step of:

acquiring a control signal with reference to which a temperature of the WDM multiplexer/demultiplexer is set by subtraction of two opto-electrically converted output reference signals of two reference signal channels at a single-channel side of the optical phased array whose filter curves intersect at a frequency corresponding to a frequency of an input reference signal supplied at a multiplex side of the optical phased array.

2. A circuit arrangement for frequency stabilization of a wavelength division multiplex (WDM) multiplexer/demultiplexer, comprising:

an optical phased array having two reference waveguide outputs at a single-channel side for which transmission behavior of the optical phased array is selected such that two filter curves associated with said outputs intersect right at a frequency corresponding to a frequency of a reference signal supplied at a multiplex side of the optical phased array; and said two reference waveguide outputs leading via respective opto-electrical transducers to two inputs of a subtraction circuit that in turn leads to a monitoring input of a control circuit connected to the optical phased array for temperature-control thereof.

3. The circuit arrangement according to claim 2 wherein the reference signal is supplied to the multiplex side of the optical phased array via an additional fiber input that is coupled to inner structure of the phased array such that the reference signal is coupled out at the intersection of said two filter curves.

4. The circuit arrangement according to claim 2 wherein a common terminal is provided for an optical multiplex signal at the multiplex side and for the optical reference signal.

5. The circuit arrangement according to claim 4 wherein the optical reference signal is fed into a multiplex fiberoptics via an optical coupler.

* * * * *